United States Patent
Lee et al.

(10) Patent No.: US 10,377,237 B2
(45) Date of Patent: Aug. 13, 2019

(54) APPARATUS AND METHOD FOR CONTROLLING LDC IN ELECTRIC VEHICLE

(71) Applicants: Hyundai Motor Company, Seoul (KR); Kia Motors Corporation, Seoul (KR)

(72) Inventors: Ho Joong Lee, Gyeonggi-do (KR); Dong Jun Shin, Gyeonggi-do (KR); Won Kyoung Choi, Gyeonggi-Do (KR); Jun Yeon Park, Gyeonggi-do (KR); Gi Bong Son, Gyeonggi-do (KR); Hyun Wook Seong, Gyeonggi-do (KR); Jee Heon Kim, Gyeonggi-Do (KR); Chang Ryeol Yoo, Incheon (KR); Hui Sung Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 15/352,401

(22) Filed: Nov. 15, 2016

(65) Prior Publication Data

US 2017/0349047 A1 Dec. 7, 2017

(30) Foreign Application Priority Data

Jun. 3, 2016 (KR) ........................ 10-2016-0069670

(51) Int. Cl.
*B60L 1/00* (2006.01)
*H02J 7/00* (2006.01)
(Continued)

(52) U.S. Cl.
CPC ................ *B60L 1/00* (2013.01); *H02J 7/007* (2013.01); *H02J 7/245* (2013.01); *H02M 3/04* (2013.01);
(Continued)

(58) Field of Classification Search
CPC . H02J 7/007; H02J 7/245; B60L 1/00; H02M 2001/0025; H02M 3/04; Y02T 10/92; Y02T 10/7005
See application file for complete search history.

(56) References Cited

U.S. PATENT DOCUMENTS 5,250,892 A * 10/1993 Yang ..................... H02J 7/0091
320/107
5,783,872 A * 7/1998 Blair ................... B60L 11/1809
307/46

(Continued)

FOREIGN PATENT DOCUMENTS

JP 2008-092729 A 4/2008
JP 2013-121313 A 6/2013
(Continued)

*Primary Examiner* — Pinping Sun
(74) *Attorney, Agent, or Firm* — Mintz Levin Cohn Ferris Glovsky and Popeo, P.C.; Peter F. Corless (57) ABSTRACT

An apparatus and a method are provided for controlling a low DC-DC converter (LDC) in an electric vehicle by prioritizing respective controllers, connecting the controllers in series in ascending order according to priority, and determining a command voltage of the LDC on the basis of output voltages of the respective controllers. Accordingly, even when a controller with a highest priority is operating, controllers of lower priority continue operating. Thus, electrical load performance degradation caused by instantaneous overcurrent generated in state transitions is prevented.

9 Claims, 5 Drawing Sheets

(51) Int. Cl.
*H02J 7/24* (2006.01)
*H02M 3/04* (2006.01)
*H02M 1/00* (2006.01)

(52) U.S. Cl.
CPC .. *H02M 2001/0025* (2013.01); *Y02T 10/7005* (2013.01); *Y02T 10/92* (2013.01)

(56) References Cited

U.S. PATENT DOCUMENTS

| | | | | |
|---|---|---|---|---|
| 7,199,558 | B2* | 4/2007 | Solie | H02J 7/0068 320/137 |
| 8,519,691 | B2* | 8/2013 | McCloy-Stevens | H02M 3/1588 323/284 |
| 8,653,804 | B2* | 2/2014 | Lin | G05F 1/67 323/282 |
| 8,928,272 | B2* | 1/2015 | Song | B60L 1/14 320/104 |
| 9,793,749 | B2* | 10/2017 | Fujii | H02J 7/045 |
| 2004/0145242 | A1* | 7/2004 | Rodriguez | H02M 3/285 307/11 |
| 2005/0068010 | A1* | 3/2005 | Chen | H02M 1/10 323/210 |
| 2010/0076647 | A1* | 3/2010 | Kamichi | B60L 11/14 701/36 |
| 2012/0110355 | A1* | 5/2012 | Ohashi | H02M 3/156 713/300 |
| 2012/0176082 | A1* | 7/2012 | Lee | B60L 1/02 320/103 |
| 2013/0093394 | A1* | 4/2013 | Iyasu | B60L 11/1811 320/109 |
| 2013/0175858 | A1 | 7/2013 | Sakurai et al. | |
| 2014/0172214 | A1* | 6/2014 | Kim | B60W 20/10 701/22 |
| 2014/0369075 | A1 | 12/2014 | Choi et al. | |
| 2015/0137824 | A1* | 5/2015 | Nishihara | G01R 31/3658 324/434 |
| 2015/0183335 | A1* | 7/2015 | Youn | B60L 11/1862 701/22 |
| 2016/0001772 | A1* | 1/2016 | Kato | B60L 11/123 701/22 |
| 2016/0105105 | A1* | 4/2016 | Choi | H02M 3/156 323/282 |
| 2016/0121725 | A1* | 5/2016 | Shin | B60L 7/16 701/22 |
| 2016/0236581 | A1* | 8/2016 | Tashiro | H02J 7/0029 |
| 2016/0248328 | A1* | 8/2016 | Zhang | H02M 3/1584 |
| 2017/0085098 | A1* | 3/2017 | Sporck | H02J 7/007 |
| 2017/0126026 | A1* | 5/2017 | Gerna | H02J 7/0077 |
| 2017/0207723 | A1* | 7/2017 | Zhang | H02M 7/537 |

FOREIGN PATENT DOCUMENTS

| | | |
|---|---|---|
| JP | 2013-165635 A | 8/2013 |
| JP | 2014-220931 A | 11/2014 |
| KR | 10-2012-0012522 A | 2/2012 |
| KR | 10-1370739 B1 | 3/2014 |
| KR | 10-1393928 B1 | 5/2014 |
| KR | 10-1417308 B1 | 7/2014 |
| KR | 10-2015-0071928 A | 6/2015 |
| KR | 10-2015-0075654 A | 7/2015 |
| KR | 10-1534972 B1 | 7/2015 |
| KR | 10-2016-0053504 A | 5/2016 |

* cited by examiner

APPARATUS AND METHOD FOR CONTROLLING LDC IN ELECTRIC VEHICLE

CROSS-REFERENCE TO RELATED APPLICATION

This application is based on and claims the benefit of priority to Korean Patent Application No. 10-2016-0069670, filed on Jun. 3, 2016, in the Korean Intellectual Property Office, the disclosure of which is incorporated herein in its entirety by reference.

TECHNICAL FIELD

The present disclosure relates to an apparatus and a method for controlling a low direct current-direct current (DC-DC) converter (LDC) in an electric vehicle and, more particularly, to a technology for controlling an LDC in an electric vehicle after connecting a variable voltage controller, a controller for compensating for voltage drop at an output terminal of the LDC, a controller for limiting a charging current of an auxiliary battery, and a controller for limiting an output current of the LDC in series in ascending order according to priority.

BACKGROUND

A conventional apparatus for controlling a low DC-DC converter (LDC) operates a variable voltage controller to determine a command voltage according to the purposes of fuel efficiency, load performance, and auxiliary battery protection, and operates a controller for compensating for voltage drop at an output terminal of the LDC to regulate the command voltage determined by the variable voltage controller to correspond to a terminal voltage of an auxiliary battery.

The variable voltage controller and the controller for compensating for voltage drop at the output terminal of the LDC may operate at all times in a normal operating state of the LDC. However, the controllers may stop when limiting a charging current for preventing the overcharging of the auxiliary battery, and a controller for limiting a charging current of the auxiliary battery may only operate to determine a command voltage of the LDC and limit the charging current.

When limiting an output current of the LDC, the variable voltage controller, the controller for compensating for voltage drop at the output terminal of the LDC, and the controller for limiting the charging current of the auxiliary battery may stop operating, and a controller for limiting the output current of the LDC may only operate to determine the command voltage of the LDC. When the operations of the controllers (logics) are stopped in particular states as described above, LDC voltage is instantaneously changed in state transitions, which may cause an increase in user inconvenience or discomfort due to instantaneous overcurrent or variations in electrical load performance.

Consequently, in the conventional apparatus for controlling an LDC, the variable voltage controller and the controller for compensating for voltage drop at the output terminal of the LDC may operate at all times in the normal operating state of the LDC, but stop operating when the controller for limiting the charging current of the auxiliary battery operates. When the controller for limiting the output current of the LDC operates, the controller for limiting the charging current of the auxiliary battery as well as the variable voltage controller and the controller for compensating for voltage drop at the output terminal of the LDC stop operating. Thus, the LDC voltage is instantaneously changed in the state transitions of respective controllers, leading to instantaneous overcurrent and electrical load performance degradation.

SUMMARY

The present disclosure provides an apparatus and a method for controlling a low DC-DC converter (LDC) in an electric vehicle by prioritizing respective controllers, connecting the controllers in series in ascending order according to priority, and determining a command voltage of the LDC based on output voltages of the respective controllers. Accordingly, even when a controller with a high priority is operating, controllers of lower priority may continue to operate. Thus, electrical load performance degradation caused by instantaneous overcurrent generated in state transitions may be prevented. Electric vehicles, according to exemplary embodiments of the present disclosure, include hybrid electric vehicles (HEVs), electric vehicles (EVs), plug-in hybrid electric vehicles (PHEVs), and fuel cell electric vehicles (FCEVs).

The objects of the present disclosure are not limited to the foregoing objects, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements and features claimed in the claims and a combination thereof.

According to an aspect of the present disclosure, an apparatus for controlling an LDC in an electric vehicle may include: a first controller configured to determine an initial command voltage of the LDC; a second controller configured to determine a compensation voltage that allows the initial command voltage to match or correspond to a terminal voltage of an auxiliary battery; a third controller configured to output a voltage that corresponds to a charging current limit of the auxiliary battery; and a command voltage determiner configured to determine a final command voltage of the LDC based on the output voltage of the first controller, the output voltage of the second controller, and the output voltage of the third controller.

According to another aspect of the present disclosure, a method for controlling an LDC in an electric vehicle may include: determining, by a first controller, an initial command voltage of the LDC; determining, by a second controller, a compensation voltage that allows the initial command voltage to match a terminal voltage of an auxiliary battery; outputting, by a third controller, a voltage that corresponds to a charging current limit of the auxiliary battery; and determining, by a command voltage determiner, a final command voltage of the LDC based on the output voltage of the first controller, the output voltage of the second controller, and the output voltage of the third controller.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above and other objects, features, and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, exemplary embodiments of the present disclosure will be described in detail with reference to the accompanying drawings.

Figure 1:
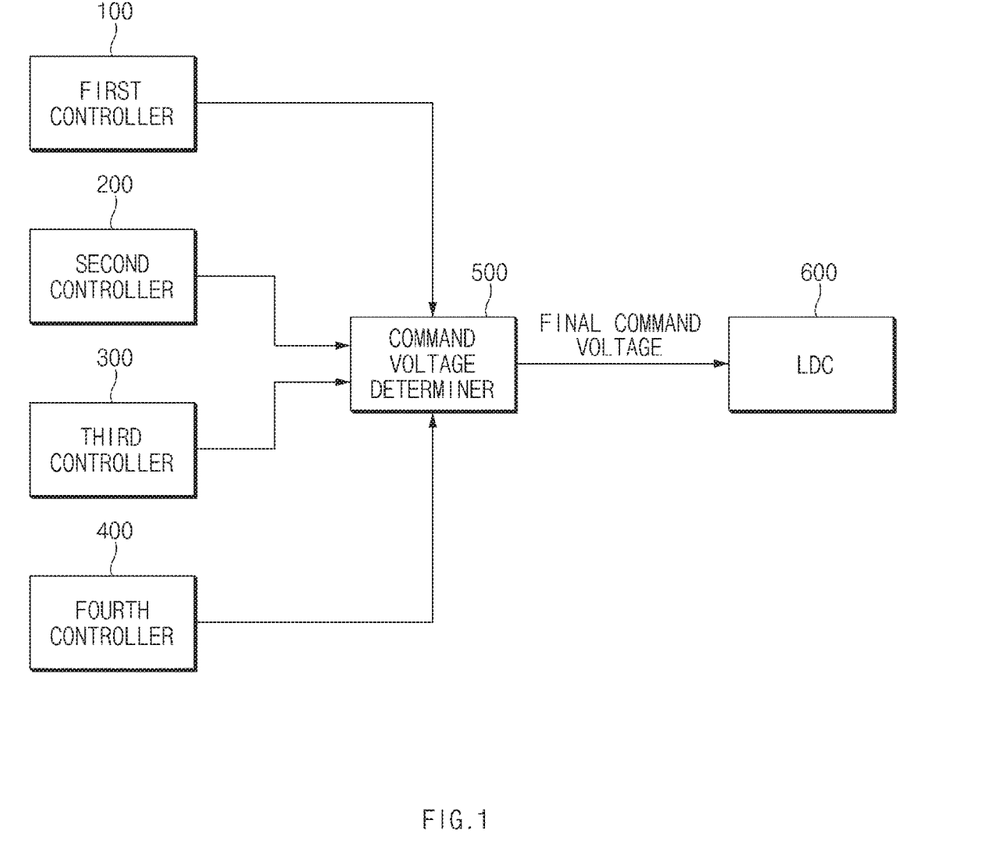
FIG. 1 illustrates the configuration of an apparatus for controlling a low DC-DC converter (LDC) in an electric vehicle, according to an exemplary embodiment of the present disclosure.

FIG. 1 illustrates the configuration of an apparatus for controlling a low DC-DC converter (LDC) in an electric vehicle, according to an exemplary embodiment of the present disclosure. As illustrated in FIG. 1, the apparatus for controlling an LDC in an electric vehicle, according to the exemplary embodiment of the present disclosure, may include a first controller 100, a second controller 200, a third controller 300, a fourth controller 400, and a command voltage determiner 500.

With respect to each of the aforementioned elements, the first controller 100 may be a variable voltage controller, and may be configured to determine an initial command voltage of an LDC 600 according to the purposes of fuel efficiency, load performance, and protection of an auxiliary battery (e.g., a lithium battery). The second controller 200 may be a controller configured to compensate for voltage drop at an output terminal of the LDC, and may be configured to determine a compensation voltage allowing the initial command voltage determined by the first controller 100 to correspond to a terminal voltage of the auxiliary battery. The first controller 100 and the second controller 200 may operate at all times while the LDC is operating.

The third controller 300 may be configured to limit a charging current of the auxiliary battery. For example, when the temperature is greater than or equal to about 44° C. and is less than about 49° C., the charging current of the auxiliary battery may be limited to about 60 A; when the temperature is greater than or equal to about 49° C. and is less than about 54° C., the charging current of the auxiliary battery may be limited to about 20 A; when the temperature is greater than or equal to about 54° C. and is less than about 55° C., the charging current of the auxiliary battery may be limited to about 10 A; and when the temperature is greater than or equal to about 55° C., the charging current of the auxiliary battery may be limited to about 60 A. Limiting the charging current of the auxiliary battery by considering the temperature is merely exemplary, and in general, the charging current of the auxiliary battery may be limited through a variety of well-known methods.

Further, the third controller 300 may be configured to output a voltage that corresponds to a charging current limit of the auxiliary battery. The fourth controller 400 may be configured to limit an output current of the LDC based on Table 1 shown below as an example.

TABLE 1

|      | 180 | 190 | 200 | 220 |
|------|-----|-----|-----|-----|
| 13.8 | ×   | ×   | ×   | 140 |
| 13.6 | ×   | ×   | 129 | 135 |
| 13.2 | ×   | 70  | 120 | 134 |
| 13.0 | ×   | 50  | 110 | 133 |
| 12.8 | 30  | 46  | 95  | 130 |

In Table 1, a horizontal axis indicates a voltage input from a high-voltage battery (not shown) to the LDC, and a vertical axis indicates an output voltage of the LDC. For example, when the input voltage of the LDC is 200V and the output voltage of the LDC is 13V, the output current of the LDC may be limited to 110 A.

The fourth controller 400 may be configured to output a voltage that corresponds to an output current limit of the LDC. The command voltage determiner 500 may be an adder-subtractor (e.g., a processor), and may be configured to determine a final command voltage of the LDC by adding or subtracting the output voltage of the first controller, the output voltage of the second controller, the output voltage of the third controller, and the output voltage of the fourth controller. Particularly, a process of determining a final command voltage by the command voltage determiner 500 will be detailed with reference to FIG. 2.

Figure 2:
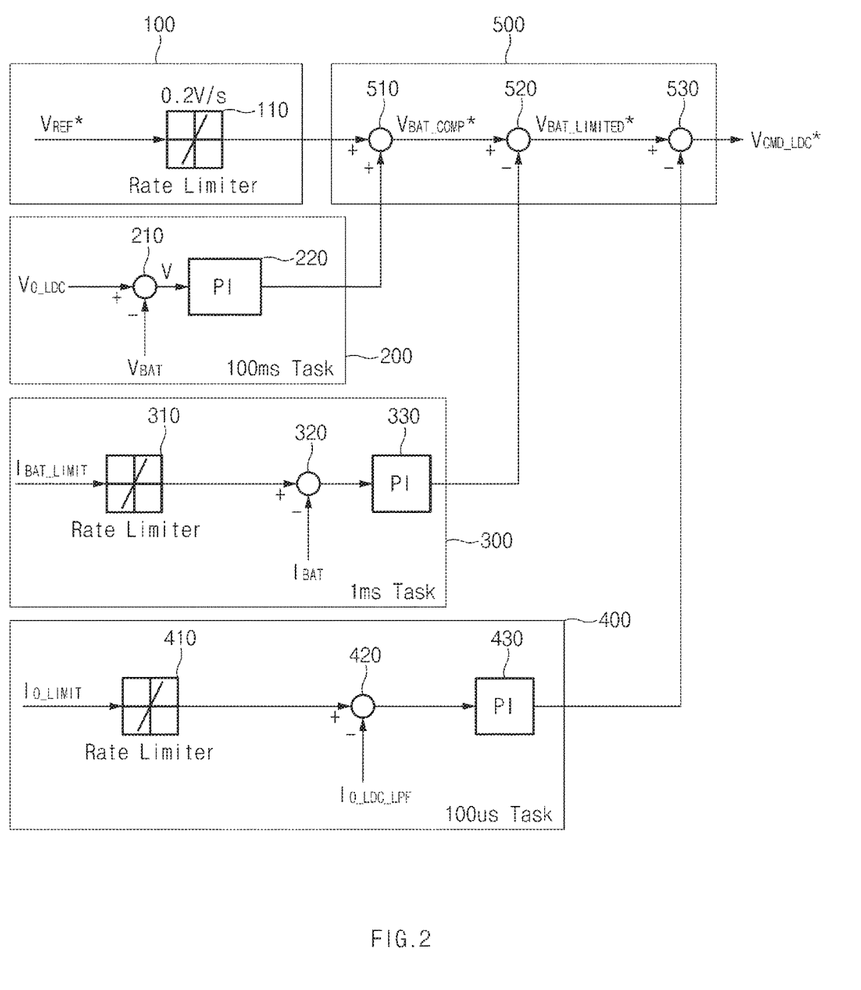
FIG. 2 illustrates a circuit diagram of an apparatus for controlling an LDC in an electric vehicle, according to an exemplary embodiment of the present disclosure.

FIG. 2 illustrates a circuit diagram of an apparatus for controlling an LDC in an electric vehicle, according to an exemplary embodiment of the present disclosure. As illustrated in FIG. 2, the first controller 100 may include a rate limiter 110 configured to limit a rate of change to prevent a sudden change of an initial command voltage $V_{REF}^*$. The rate limiter 110 may allow the initial command voltage to be limited in a range of not exceeding a reference value per second.

The second controller 200 may include a subtractor 210 configured to subtract a voltage $V_{BAT}$ of the auxiliary battery from an output voltage $V_{O\_LDC}$ of the LDC, and a proportional integral (PI) logic 220 for PI control of the subtracted result of the subtractor 210. The third controller 300 may include a rate limiter 310 configured to limit a rate of change of a charging current limit $I_{BAT\_LIMIT}$ of the auxiliary battery, a subtractor 320 configured to subtract a current $I_{BAT}$ of the auxiliary battery from an output current of the rate limiter 310, and a PI logic 330 for PI control of the subtracted result of the subtractor 320.

Additionally, the fourth controller 400 may include a rate limiter 410 configured to limit a rate of change of an output current limit $I_{O\_LIMIT}$ of the LDC, a subtractor 420 configured to subtract an output current $I_{O\_LDC\_LPF}$ of the LDC from an output current of the rate limiter 410, and a PI logic 430 for PI control of the subtracted result of the subtractor 420. Further, 'Anti-Windup Limit' as an internal variable may be set to be a result obtained by subtracting the output current (sensed value) of the LDC from the output current limit of the LDC. Particularly, an operating cycle of the third controller 300 may be faster than that of the second controller 200, and an operating cycle of the fourth controller 400 may be faster than that of the third controller 300. The command voltage determiner 500 may include an adder 510, a first subtractor 520, and a second subtractor 530. The adder 510 may be configured to add the initial command voltage from the first controller 100 and the compensation voltage from the second controller 200, and the added result may be a voltage $V_{BAT\_COMP}^*$ obtained by applying a voltage drop compensation logic to the initial command voltage.

The first subtractor 520 may be configured to subtract a voltage that corresponds to the charging current limit of the auxiliary battery from the added result $V_{BAT\_COMP}^*$ of the adder 510, and the subtracted result may be a voltage $V_{BAT\_LIMITED}^*$ to which a charging current limit logic of the auxiliary battery is applied. The second subtractor 530 may be configured to subtract a voltage that corresponds to the output current limit of the LDC from the subtracted result $V_{BAT\_LIMITED}^*$ of the first subtractor 520, and the subtracted result may be a voltage $V_{CMD\_LDC}^*$ (a final command voltage) to which an output current limit logic of the LDC is applied. However, when the second subtractor 530 does not receive the voltage that corresponds to the output current limit of the LDC, the output voltage $V_{BAT\_LIMITED}^*$ of the first subtractor 520 may be a final command voltage.

Meanwhile, when the first subtractor 520 does not receive the voltage that corresponds to the charging current limit of the auxiliary battery and the second subtractor 530 does not receive the voltage to which the output current limit logic of the LDC is applied, the output voltage $V_{BAT\_COMP}^*$ of the adder 510 may be a final command voltage. In other words, in a normal operating state, the output voltage $V_{BAT\_COMP}^*$ of the adder 510 may be the final command voltage; however, when the charging current of the auxiliary battery is limited, the output voltage $V_{BAT\_LIMITED}^*$ of the first subtractor 520 may be the final command voltage, and when the output current of the LDC is limited, the output voltage $V_{CMD\_LDC}^*$ of the second subtractor 530 may be the final command voltage.

According to the present inventive concept, the first controller 100, the second controller 200, the third controller 300, and the fourth controller 400 may be sequentially connected via the command voltage determiner 500, and thus, the LDC may be operated by a controller with a highest priority regardless of the operations of controllers of lower priority. This will be illustrated with reference to FIG. 3.

Figure 3:
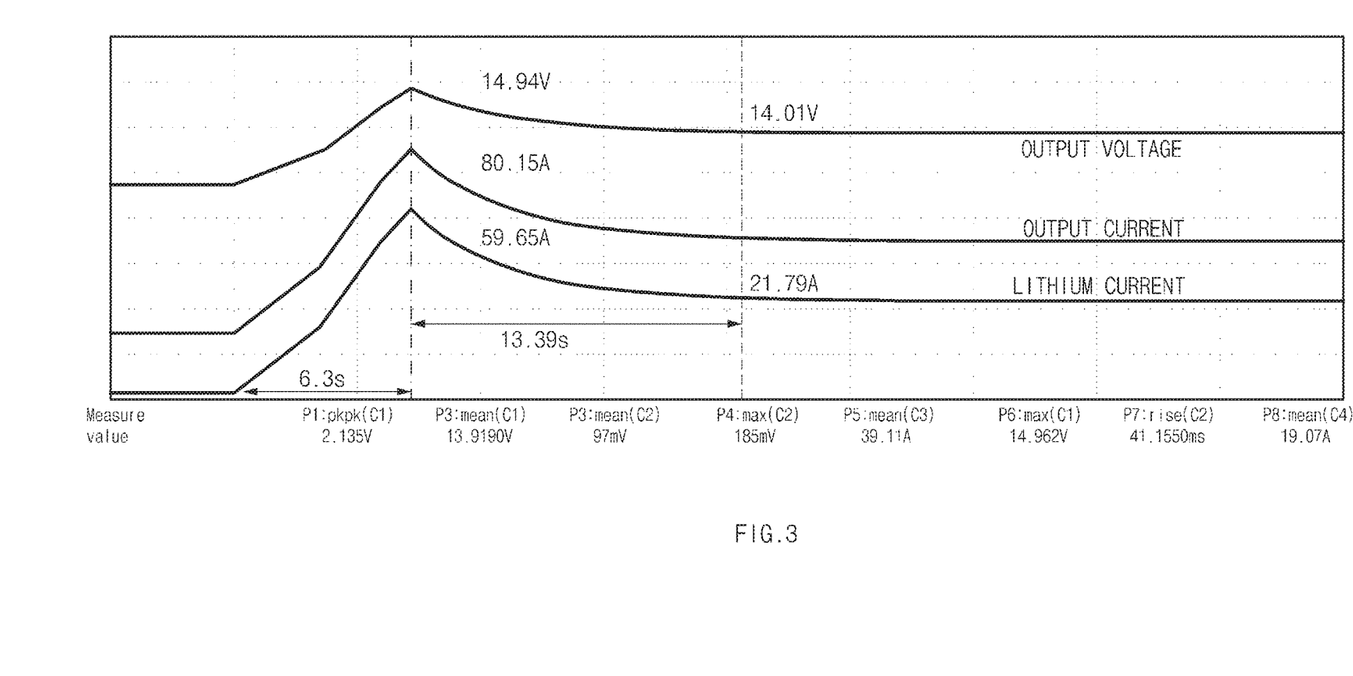
FIG. 3 illustrates the results of controlling an LDC by an apparatus for controlling an LDC in an electric vehicle, according to an exemplary embodiment of the present disclosure.

FIG. 3 illustrates the results of controlling an LDC by an apparatus for operating an LDC in an electric vehicle, according to an exemplary embodiment of the present disclosure, and shows that a charging current of the auxiliary battery (e.g., a lithium battery) is limited. Test conditions were as follows: input voltage 240V; load 10 A; auxiliary battery controller area network (CAN) transmission 100 ms; auxiliary battery internal resistance 10 mΩ; command voltage 15.1V; and charging current limit 20 A. As shown in FIG. 3, a charging voltage with respect to the command voltage of 15.1V was limited to 14.94V, a controller stabilization time was 11.65 s, and the charging current limit of the auxiliary battery was normally limited to 20 A.

Figure 4:
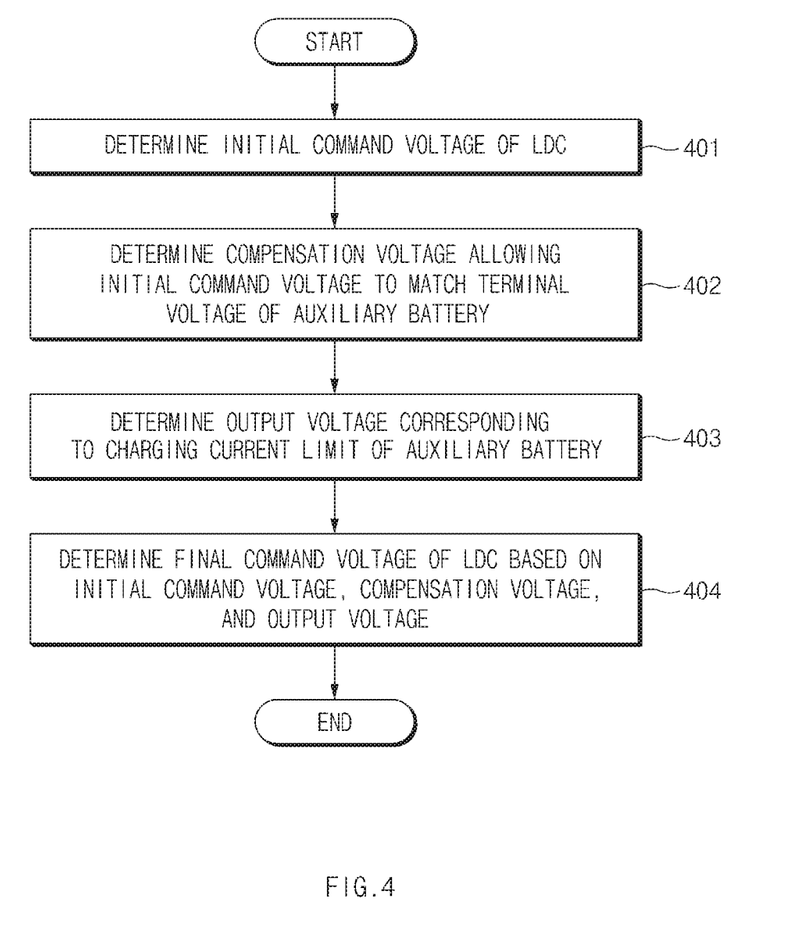
FIG. 4 illustrates a flowchart of a method for controlling an LDC in an electric vehicle, according to an exemplary embodiment of the present disclosure.

FIG. 4 illustrates a flowchart of a method for controlling an LDC in an electric vehicle, according to an exemplary embodiment of the present disclosure. First, the first controller 100 may be configured to determine an initial command voltage of the LDC in operation 401. The second controller 200 may then be configured to determine a compensation voltage that allows the initial command voltage to correspond to a terminal voltage of the auxiliary battery in operation 402. Thereafter, the third controller 300 may be configured to output a voltage that corresponds to a charging current limit of the auxiliary battery in operation 403. The command voltage determiner 500 may then be configured to determine a final command voltage of the LDC based on the output voltage of the first controller, the output voltage of the second controller, and the output voltage of the third controller in operation 404. Accordingly, the LDC may then be operated by an upper or general controller based on the final command voltage.

Figure 5:
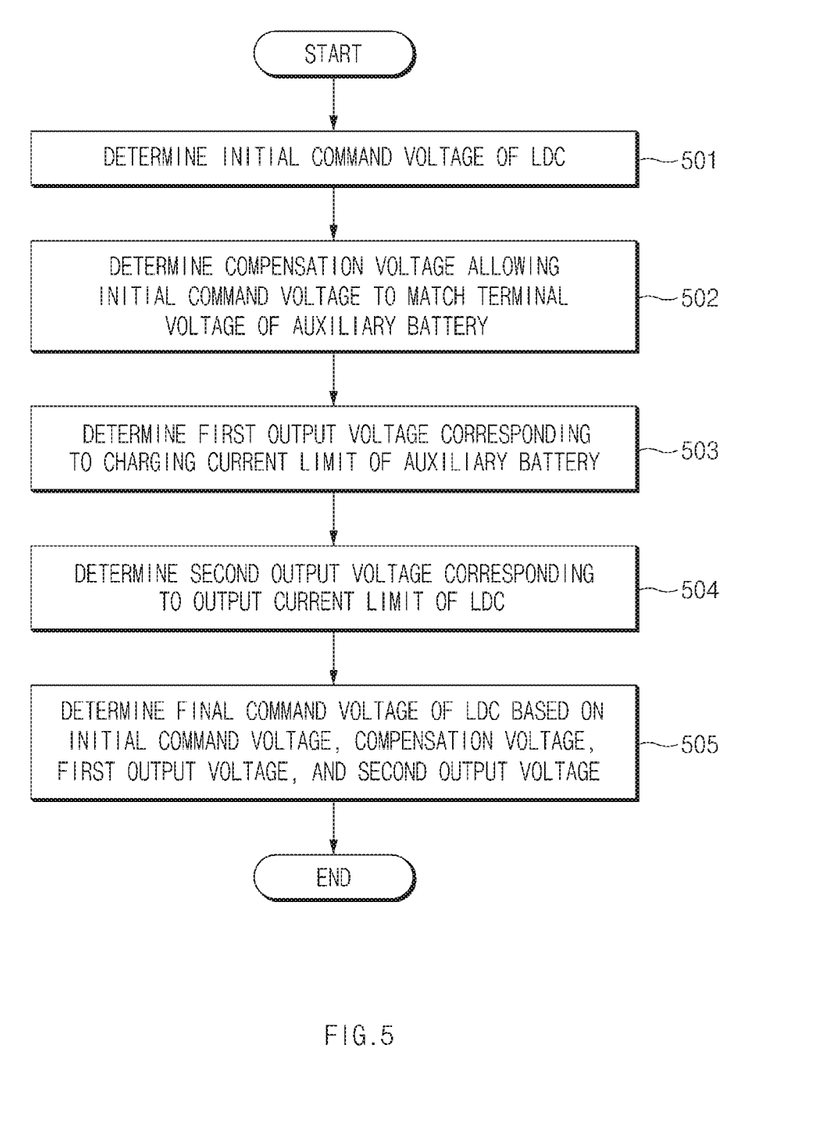
FIG. 5 illustrates a flowchart of a method for controlling an LDC in an electric vehicle, according to another exemplary embodiment of the present disclosure.

FIG. 5 illustrates a flowchart of a method for controlling an LDC in an electric vehicle, according to another exemplary embodiment of the present disclosure. The first controller 100 may first be configured to determine an initial command voltage of the LDC in operation 501. The second controller 200 may then be configured to determine a compensation voltage that allows the initial command voltage to correspond to a terminal voltage of the auxiliary battery in operation 502. Thereafter, the third controller 300 may be configured to output a voltage that corresponds to a charging current limit of the auxiliary battery in operation 503.

Additionally, the fourth controller 400 may then be configured to output a voltage that corresponds to an output current limit of the LDC in operation 504. Finally, the command voltage determiner 500 may be configured to determine a final command voltage of the LDC based on the output voltage of the first controller, the output voltage of the second controller, the output voltage of the third controller, and the output voltage of the fourth controller in operation 505 to thus operate the LDC accordingly.

Meanwhile, the above-stated method according to the exemplary embodiments of the present disclosure may be written as a computer program. Codes and code segments constituting the program may easily be inferred by a computer programmer skilled in the art. The written program may be stored in a non-transitory computer-readable recording medium (an information storage medium) and be read and executed by a computer, thereby implementing the method according to the exemplary embodiments of the present disclosure. The recording medium includes all types of non-transitory computer-readable recording media.

As set forth above, by prioritizing respective controllers, connecting the controllers in series in ascending order according to priority, and determining the command voltage of the LDC based on the output voltages of the respective controllers, even when a controller with a highest priority is operating, controllers of lower priority do not need to stop their operations, that is, the lower priority controllers may continue operating. Thus, electrical load performance degradation caused by instantaneous overcurrent generated in state transitions may be prevented.

In addition, the present inventive concept may prevent abnormal operations in state transitions by improving LDC control configurations, and enable an appropriate selection of control gain to improve the fuel efficiency of the electric vehicle and protect the auxiliary battery. Furthermore, the present inventive concept may facilitate the development of fuel efficiency items using the auxiliary battery current control by changing the controller for limiting the charging current of the auxiliary battery to a charging current controller.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a direct current-direct current (DC-DC) converter in an electric vehicle, comprising:
a first controller configured to determine an initial command voltage of the DC-DC converter;
a second controller configured to determine a compensation voltage allowing the initial command voltage to correspond to a terminal voltage of an auxiliary battery;
a third controller configured to generate a first output voltage that corresponds to a charging current limit of the auxiliary battery;
a fourth controller configured to generate a second output voltage that corresponds to an output current limit of the DC-DC converter; and
a command voltage determiner configured to determine a first final command voltage of the DC-DC converter based on the initial command voltage from the first controller, the compensation voltage from the second controller, and the first output voltage of the third controller, and to operate the DC-DC converter based on the first final command voltage,
wherein an operating cycle of the third controller is faster than an operating cycle of the second controller, and an operating cycle of the fourth controller is faster than the operating cycle of the third controller.

2. The apparatus according to claim 1, wherein the command voltage determiner includes: an adder configured to generate an adding result by adding the compensation voltage to the initial command voltage; and
a subtractor configured to subtract the first output voltage of the third controller from the adding result.

3. The apparatus according to claim 1, wherein the command voltage determiner is configured to determine a second final command voltage of the DC-DC converter based on the initial command voltage from the first controller, the compensation voltage from the second controller, the first output voltage of the third controller, and the second output voltage of the fourth controller, and to operate the DC-DC converter based on the determined second final command voltage.

4. The apparatus according to claim 3, wherein the command voltage determiner includes:
an adder configured to generate an adding result by adding the compensation voltage to the initial command voltage;
a first subtractor configured to generate a first subtracting result by subtracting the first output voltage of the third controller from the adding result; and
a second subtractor configured to subtract the second output voltage of the fourth controller from the first subtracting result.

5. The apparatus according to claim 1, wherein the third controller is configured to limit a charging current of the auxiliary battery according to temperature.

6. A method for controlling a direct current-direct current (DC-DC) converter in an electric vehicle, comprising:
determining, by a first controller, an initial command voltage of the DC-DC converter;
determining, by a second controller, a compensation voltage allowing the initial command voltage to correspond to a terminal voltage of an auxiliary battery;
outputting, by a third controller, a first output voltage that corresponds to a charging current limit of the auxiliary battery;
outputting, by a fourth controller, a second output voltage that corresponds to an output current limit of the DC-DC converter;
determining, by a command voltage determiner, a first final command voltage of the DC-DC converter based on the initial command voltage from the first controller, the compensation voltage from the second controller, and the first output voltage of the third controller; and operating the DC-DC converter on the determined first final command voltage, wherein an operating cycle of the third controller is faster than an operating cycle of the second controller, and an operating cycle of the fourth controller is faster than the operating cycle of the third controller.

7. The method according to claim 6, wherein the determining of the first final command voltage includes:

adding the compensation voltage to the initial command voltage to generate an adding result; and determining a result of subtracting the first output voltage of the third controller from the adding result as the first final command voltage.

8. The method according to claim 6, further includes:

determining a second final command voltage of the DC-DC converter based on the initial command voltage from the first controller, the compensation voltage from the second controller, the first output voltage of the third controller, and the second output voltage of the fourth controller.

9. The method according to claim 8, wherein the determining of the second final command voltage includes:

adding the compensation voltage to the initial command voltage to generate an adding result;

subtracting the first output voltage of the third controller from the adding result to generate a first subtracting result; and determining a result of subtracting the second output voltage of the fourth controller from the first subtracting result as the second final command voltage.

* * * * *